1

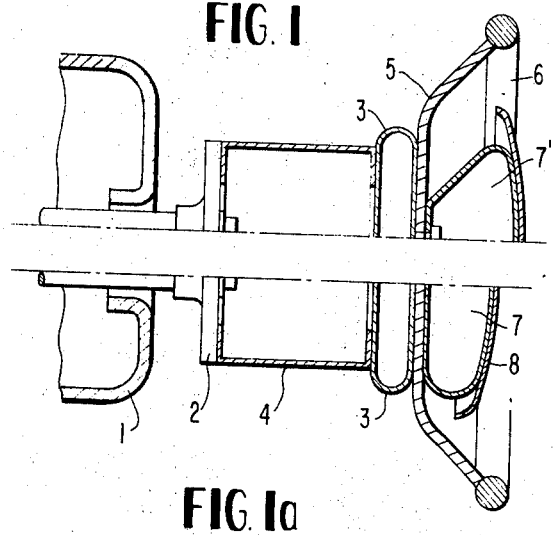
FIG. 1
FIG. 1a
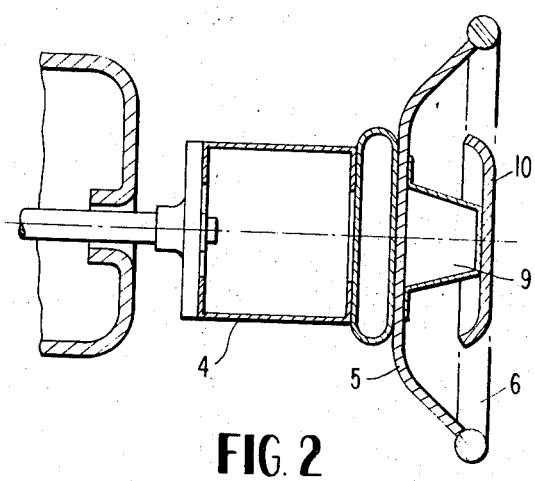
FIG. 2
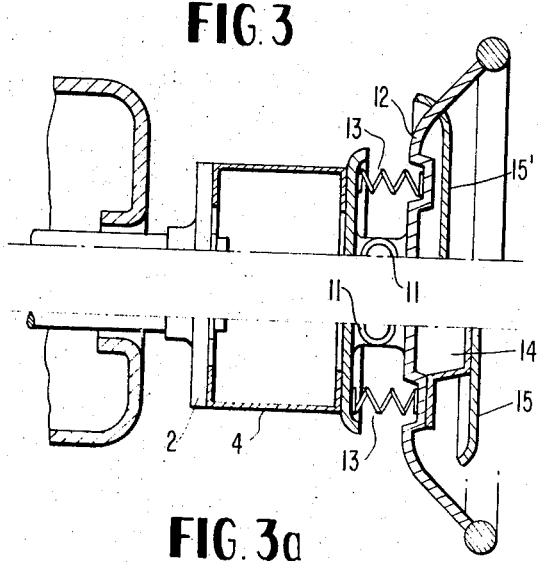
FIG. 3
FIG. 3a
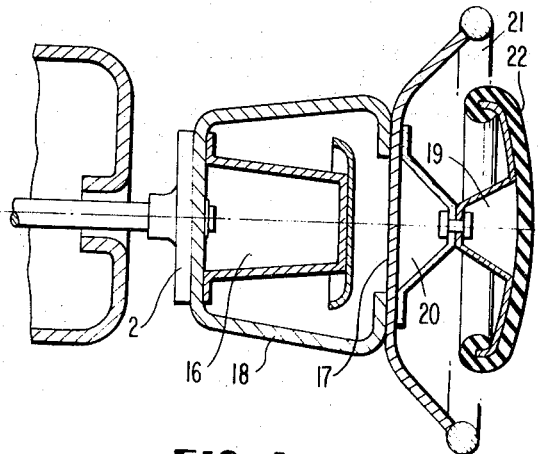
FIG. 4
INVENTORS
KARL WILFERT
BELA BARENYI
ATTORNEYS United States Patent Office 3,546,964
Patented Dec. 15, 1970

3,546,964
SAFETY STEERING WHEEL FOR
MOTOR VEHICLES
Bela Barenyi, Stuttgart-Vaihingen, and Karl Wilfert, Gerlingen-Waldstadt, Germany, assignors to Daimler-Benz Aktiengesellschaft, Stuttgart-Unterturkheim, Germany
Filed Sept. 18, 1968, Ser. No. 760,474
Claims priority, application Germany, Sept. 19, 1967, 1,630,356
Int. Cl. B62d 1/04
U.S. Cl. 74—552  13 Claims

ABSTRACT OF THE DISCLOSURE

A safety steering wheel for motor vehicles, in particular for passenger motor vehicles, which consists of a system "steering wheel-steering wheel spokes" constructed relatively form-rigid that is secured at the steering column head under interposition of a deformation pot, whereby an elastic intermediate member is so arranged between the system "steering wheel-steering wheel spokes" and the steering column that the deformation pot becomes effective only upon exceeding a predetermined force or a predetermined path.

The present invention relates to a safety steering wheel for motor vehicles, especially for passenger motor vehicles, which consists of a relatively form-rigid system "steering wheel-steering wheel spokes" that is secured at the steering column head preferably arranged far forwardly, under the interposition of a deformation pot.

Such types of safety steering wheels, as are known for example by the German Pat. 947,048 or by U.S. Pat. 3,167,974, are intended to yield in the direction of the steering column during an impact of the driver against the safety steering wheel and are thereby to dissipate energy by deformation work. This measure, extraordinarily advantageous for the safety of the driver, in which the steering forces are safely transmitted, offers certain difficulties during the realization in practice because steering wheels, in addition to being exposed to the steering forces and to the impact forces in case of accidents, are exposed to still further forces during normal operation which may assume considerable magnitudes. Frequently, the drive holds fast at the steering wheel during boarding or while straightening out the clothes whereby in part considerable forces are applied to the steering wheel which, however, should not lead to a deformation and therewith to a damaging of the steering wheel.

The present invention aims at avoiding these difficulties with a safety steering wheel of the aforementioned type. The present invention essentially consists in that an elastic intermediate member is arranged between the system "steering wheel-steering wheel spokes" and the steering column in such a manner that the deformation pot comes into operation, i.e., becomes effective, only after exceeding a predetermined force and/or a predeterminned path. It is achieved thereby that the safety steering wheel, up to predetermined loads and in case of predetermined types of loads, is elastically yielding whereas the known safety effect is preserved.

The elastically deformable intermediate member may be arranged in an advantageous manner between the system "steering wheel-steering wheel spokes" and the deformation pot. One or several approximately oval spring rings may serve in a structurally simple manner as elastic intermediate member. It may also be advantageous if the system "steering wheel-steering wheel spokes" is pivotally connected with the deformation pot and is supported by way of springs.

2

If it is to be attained that up to predetermined loads or with predetermined types of loads, the deformation pot is not loaded, then the system "steering wheel-steering wheel spokes" may be connected at the steering column head by way of an elastic intermediate member within which a deformation pot may be arranged at a distance to the hub base body.

In order to create a large impact surface for the driver which itself already contributes to the reduction of the injury danger, according to a further feature of the present invention the hub base body may be disposed lower than the plane of the steering wheel rim, and deformation member provided preferably with a padded cover may be arranged on the hub base body.

Accordingly, it is an object of the present invention to provide a safety steering wheel for motor vehicles, especially for passenger motor vehicles, which effectively eliminates by extremely simple means the aforementioned shortcomings encountered in the prior art.

Another object of the present invention resides in a safety steering wheel for motor vehicles which is able to elastically absorb loads up to predetermined magnitudes as well as loads of predeterminned types without affecting the deformation pot.

A further object of the present invention resides in a safety steering wheel which will not undergo permanent deformation when subjected to loads of certain types and loads below a predetermined magnitude.

Another object of the present invention resides in a safety steering wheel which is elastically yielding up to a predetermined load and with certain types of loads.

These and further objects, features, and advantages of the present invention will become more obvious from the following description when taken in connection with the accompanying drawing which shows, for purposes of illustration only, several embodiments in accordance with the present invention, and wherein:

FIG. 1 is a partial axial cross-section view through one half of a safety steering wheel in accordance with the present invention;

FIG. 1a is a partial axial cross-sectional view through one half of a modified embodiment of a safety steering wheel in accordance with the present invention, similar to FIG. 1;

FIG. 2 is an axial cross-sectional view through a further modified embodiment of a safety steering wheel, similar to FIG. 1 in accordance with the present invention;

FIG. 3 is a partial axial cross-sectional view through one half of a still further modified embodiment of a safety steering wheel in accordance with the present invention;

FIG. 3a is a partial axial cross-sectional view through one half of a modified embodiment of the safety steering wheel of FIG. 3; and FIG. 4 is an axial cross-sectional view through still another modified embodiment of a safety steering wheel in accordance with the present invention.

Referring now to the drawing wherein like reference numerals are used throughout the various views to designate like parts and more particularly to FIG. 1 and 1a, the safety steering wheel is secured at the steering column head 2 which, as viewed from the driver, is located relatively far forwardly and directly to the rear of the instrument panel 1. The safety steering wheel consists of a system "steering wheel-steering wheel spokes" constructively relatively form-rigid in any conventional known manner and is secured at a deformation pot 4 under interposition of an approximately oval spring ring 3; the deformation pot 4, in its turn, is secured at a flange of the steering column head 2. The hub base body 5 is disposed lower than the steering wheel rim 6 and a deformation member 7 (FIG. 1a) or 7' (FIG. 1) is arranged in the space thus formed which, as shown in FIG. 1, projects beyond the plane of the steering wheel rim 6 or, as shown in FIG. 1a, may remain below the plane of the steering wheel rim 6. This deformation member 7 or 7' is provided with a large-surface cover disk 8. The deformation pot 4 and the spring ring 3 are so dimensioned that up to predetermined loads or with predetermined types of loads an elastic deformation of the spring ring 3 takes place whereas the deformation pot 4 is not yet deformed. The relatively form-rigid system "steering wheel-steering wheel spokes" together with the deformation member 7 or 7' offers a large abutment surface in case of an impact of the driver which contributes to the reduction of the injury danger of the driver.

In the safety steering wheel according to FIG. 2, which is similarly contructed in principle, the deformaton member 9 secured on the hub base body 5 consists of a conically tapering symmetrical body or body of revolution which is provided with a large-surfaced cover disk 10 that lies approximately in the plane of the steering wheel rim 6.

The system "steering wheel-steering wheel spokes" of the embodiment according to FIGS. 3 and 3a is connected by way of a joint 11 with the deformation pot 4 secured on the steering column head 2. In order to attain an elastic yieldingness of the safety steering wheel up to predetermined loads or with predetermined types of loads, for example, when the driver pulls himself up at the steering wheel, coil springs 13 are arranged between the deformation member 4 and the hub base body 12 which are stressed by movements about the joint 11. A deformation member 14 (FIG. 3a) with a cover plate 15 may also be arranged on the hub base body 12. However, it may also suffice if, for the creation of a large impact surface, only a large-surfaced cover plate 15' is arranged on the hub base body 12 as shown in FIG. 3.

In the embodiment according to FIG. 4, provision is made that the deformation pot 16 is not exposed to any force up to predetermined loads or with predetermined types of loads. The system "steering wheel-steering wheel spokes" is secured directly at the flange of the steering column head 2 by way of an elastic intermediate member 18 secured at the hub base body 17. The deformation pot 16, which is arranged on the inside of the elastic intermediate member 18, is exposed to a force only upon exceeding a predetermined spring path and therewith a predetermined load. A deformation member consisting of two conically tapering parts 19 and 20 which is arranged on the hub base body 17, projects beyond the plane of the steering wheel rim 21 and is provided with a padded cover plate 22. In this embodiment, the normal loads and steering forces are transmitted to the steering column by the elastic member 18. Only in case of an impact of the driver as a result of an accident, the elastic intermediate member 18 can deform to such an extent that the deformation pot 16 becomes effective.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as known to those skilled in the art.

It is claimed:

1. A safety steering wheel for motor vehicles, especially passenger vehicles, comprising a "steering wheel-steering wheel spokes " system operatively connected at the head of a steering column with plastically deformable deformation pot means interposed therebetween, and elastically deformable intermediate means operatively associated with said deformation pot means and arrangeed between the "steering wheel-steering wheel spokes" system and the steering column head so that an impact upon the safety steering wheel in aproximately the direction of the steering column is first absorbed by said elastically deformable intermediate means and then, only after the spring force of said elastic intermediate means is exceeded, by said deformation pot means.

2. A safety steering wheel according to claim 1, wherein said "steering wheel-steering wheel spokes" system is relatively form-rigid.

3. A safety steering wheel according to claim 1, wherein the elastically deformable intermediate means is provided between said system and the deformation pot means.

4. A safety steering wheel according to claim 3, wherein at least one spring ring means serves as said elastically deformable intermediate means.

5. A safety steering wheel according to claim 4, wherein said spring means is of approximately oval shape.

6. A safety steering wheel according to claim 3, wherein said system is pivotally connected with the deformation pot means and is supported by spring means.

7. A safety steering wheel according to claim 1, wherein said "steering wheel-steering wheel spokes" system includes a hub base body and is operatively connected with the steering column head by way of the intermediate means, the deformation pot means being arranged within said intermediate means at a distance from the hub base body.

8. A safety steering wheel according to claim 7, wherein the hub base body of the steering wheel is disposed lower than the plane of the steering wheel rim, and further deformation means arranged on the hub base body.

9. A safety steering wheel according to claim 8, wherein said further deformation means is provided with a padded cover means.

10. A safety steering wheel according to claim 1, wherein at least one spring ring means serves as elastic intermediate means.

11. A safety steering wheel according to claim 1, wherein said system is pivotally connected with the deformation pot means and is supported by spring means.

12. A safety steering wheel with a hub base body according to claim 1, wherein the hub base body of the steering wheel is disposed lower than the plane of the steering wheel rim, and further deformation means arranged on the hub base body.

13. A safety steering wheel according to claim 12, wherein said further deformation means is provided with a padded cover means.

References Cited

UNITED STATES PATENTS

| 3,055,231 | 9/1962 | Daniel | 74—552 |
|---|---|---|---|
| 3,167,974 | 2/1965 | Wilfert | 74—552 |
| 3,285,091 | 11/1966 | Fiala | 74—552 |
| 3,435,701 | 4/1969 | Bucher | 74—552 |

FOREIGN PATENTS

| 341,185 | 1/1931 | England | 74—552 |
|---|---|---|---|
| 64,798 | 6/1955 | France | 75—552 (UX) |
| 65,850 | 11/1955 | France | 75—552 |

FRED C. MATTERN, Jr., Primary Examiner

F. D. SHOEMAKER, Assistant Examiner